INVENTOR.
CHESTER V. CLAYPOOL, JR.
BY
Nathan J. Cornfeld
ATTORNEY

ANNULAR CATHODE ELECTRODE SUPPORT

Filed Oct. 24, 1963 3 Sheets-Sheet 2

INVENTOR.
CHESTER V. CLAYPOOL, JR.
BY
Nathan J. Cornfeld
ATTORNEY

Jan. 17, 1967 C. V. CLAYPOOL, JR 3,299,309

ANNULAR CATHODE ELECTRODE SUPPORT

Filed Oct. 24, 1963 3 Sheets-Sheet 3

INVENTOR.
CHESTER V. CLAYPOOL, JR.

BY Nathan Kompfner

ATTORNEY

United States Patent Office 3,299,309
Patented Jan. 17, 1967

3,299,309
ANNULAR CATHODE ELECTRODE SUPPORT

Chester V. Claypool, Jr., Owensboro, Ky., assignor to General Electric Company, a corporation of New York Filed Oct. 24, 1963, Ser. No. 318,635
5 Claims. (Cl. 313—250)

This invention relates to electrode supports in electron discharge devices, and more specifically pertains to such supports in discharge devices comprising a plurality of metal terminals separated by a plurality of insulating spacers.

While much which had been the exclusive province of the electron discharge device or vacuum tube has been invaded during the past decade by semiconductor devices, there is yet a substantial reserved area wherein it is desirable, and frequently essential, that vacuum tubes be utilized. For example, vacuum tubes are often used today when it is required that a signal to be amplified be almost totally isolated from the amplified signal, that extraneous signals introduced by the amplifying device be minimized, or that the ambient temperature exceed 300° C. It is not uncommon to find both vacuum tubes and semiconductors combined in a hybrid circuit wherein each perform the functions for which they are particularly well suited.

It is apparent that the conventional vacuum tube, with a relatively large fragile glass envelope and large electrodes, is unsatisfactory in many applications, particularly where great mechanical shocks or high frequency vibrations must be endured. Also, the materials used for the envelope, electrodes, and supporting structure of conventional vacuum tubes tend to alloy, evolve gas, melt, or all three when subjected to high temperatures. The ceramic vacuum tube has been developed in response to the need for a rugged, high temperature device.

Ceramic vacuum tubes frequently take the form of a plurality of coaxially disposed annular metal terminals sealed to and separated by a plurality of coaxially disposed annular insulating spacers. In assembled relationship, the terminals and spacers define a walled electrode cavity which is evacuated and houses the various electrodes, which generally are of the planar variety. Ceramic vacuum tubes can be designed to be compact in size, and devices having an electrode cavity the size of a pencil eraser are not uncommon.

The high temperature of operation in ceramic vacuum tubes has required marked departures from conventional vacuum tube design, both as to the structure of the tube and the materials used therein. As to the structure, it is necessary that the heated cathode be thermally isolated from the ceramic tube envelope. Usually this is achieved by providing a cathode in the form of a disk supported on a sleeve or support cylinder which carries the cathode at one end and is fixed to the tube envelope near the other end. Such thermal isolation of the cathode allows efficient operation of the cathode at elevated temperatures, while not requiring that excessive power be supplied to an associated heating coil disposed adjacent the cathode disk.

As in all vacuum tubes, the spacing between electrodes must be maintained at a predetermined desired distance, and any departure therefrom is attended by a change in tube characteristics. Therefore, the metal used for the cathode support sleeve must have a rate of thermal expansion comparable to that of the insulating spacers which separate the electrodes. This is required to maintain consistent operation of the ceramic tube over a wide range of operating temperatures. The sleeve must also be a satisfactory conductor of electricity, since it provides part of the electrical circuit which includes the cathode. These and other considerations, including freedom from evolving trapped gases when subjected to high temperatures, have led to the selection of nickel-chromium alloy as the material to be used for the cathode support sleeve.

The varied problems associated with providing a terminal which may be tightly sealed to the insulating spacers between which it is sandwiched, have led to the use of titanium. The titanium terminal is sealed to the insulating spacer by providing a nickel shim between the two surfaces to be sealed and thereafter heating the assembled parts until the nickel alloys with the titanium to provide an hermetic seal. The use of a cathode terminal of titanium, which is sealed by alloying with a nickel shim to the insulating spacer, in combination with a nickel-chromium alloy support sleeve for the cathode, presents the problem to which this invention is addressed. In such a ceramic tube, the cathode terminal must not be in direct contact with the support sleeve, such as by welding thereto, since the nickel in the nickel-chromium alloy will alloy with the titanium when the sealing temperature is reached. Alloying between the members allows relative movement therebetween, destroying the accuracy with which the cathode was aligned with respect to the insulating spacer. As mentioned before, the electrode spacing in vacuum tubes is critical, and this relative motion, and consequent misalignment, may not be tolerated. In the past, it has been attempted to isolate the cathode sleeve from the titanium by providing about the cathode sleeve a coating or thin metal foil of a buffer material which does not alloy with the titanium at the sealing temperature. Difficulties encountered with this expedient include mechanical stripping of the foil from the cathode sleeve when inserted into the titanium terminal, and punching through the foil during welding of the cathode sleeve to the terminal. Either occurrence results in physical contact between the nickel-chromium alloy and titanium, and the undesired alloying is permitted.

Accordingly it is an object of this invention to provide an electron discharge device having a cathode sleeve which is electrically connected to the cathode terminal but not in direct mechanical contact therewith.

It is still another object of this invention to provide a cathode terminal assembly to which a cathode support sleeve may be welded and yet isolated from the metal of the cathode terminal itself.

It is yet another object of this invention to provide a cathode support sleeve securing means which prevents alloying between the metal of the support sleeve and the metal of an associated cathode terminal.

In accordance with a preferred embodiment of this invention, an annular recess is formed in the upper surface of the annular cathode terminal. Thereafter, an annular sealing shim of nickel is disposed over the recess, and aligned coaxially with the terminal. An annular disk is pressed into the recess, forcing the nickel shim to generally conform to the sides of the recess. The annular disk and nickel shim substantially fill the recess, and the disk extends into the cavity defined by the annular terminal. An annular insulating spacer is then aligned with the terminal abutting portions of the terminal, shim and disk. This assembly is then compressed and heated to a temperature in the range of 800° C. to 1100° C., whereby the shim and terminal alloy to provide an hermetic seal between the spacer and terminal. The cathode sleeve is then welded to the inner peripheral surface of the disk. Alloying between the disk and sleeve is prevented by selecting the material of the disk from one of a large number of materials which do not alloy with nickel at the sealing temperature, for example, tantalum or 430 stainless steel. Thereafter, when the assembly is heated to seal other electrode terminals, or heated during normal use, the cathode sleeve remains rigidly secured in its relationship to the spacer and terminal.

The invention possesses other objects and features of advantage, some of which, with the foregoing, will be set forth in the following description of the invention. It is to be understood that the invention is not limited to the specific species disclosed, as variant embodiments thereof may be adopted within the true spirit and scope of the appended claims.

Referring to the drawing.

Figure 1:
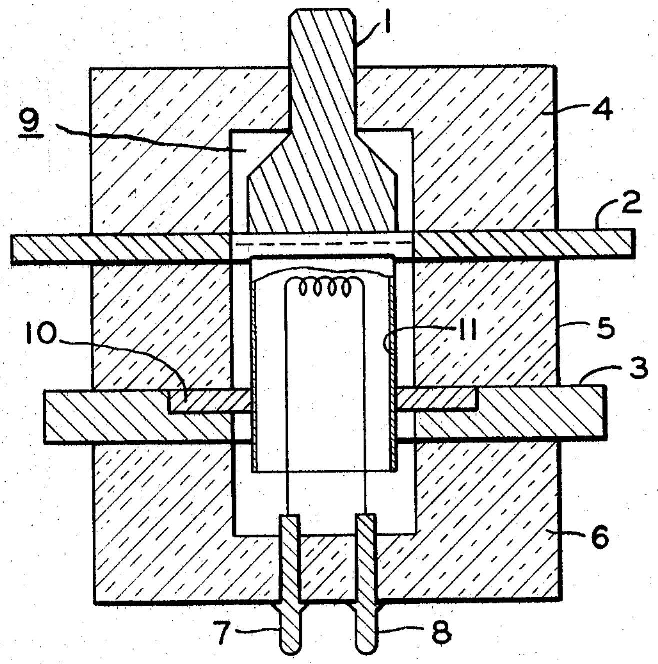
FIG. 1 shows a cross-section of a discharge device of the general type to which this invention relates.

FIG. 1 shows a specific electric discharge device which is of the general type to which the present invention relates. For illustrative purposes, the device selected is a ceramic tube having a plurality of metallic terminals separated by a plurality of insulating spacers. A preferred embodiment of the cathode support of the present invention is shown in FIG. 1.

More particularly, the tube of FIG. 1 includes an anode terminal 1, a grid terminal 2 and a cathode terminal 3. Each of the aforementioned terminals provides an electrical connection to a corresponding electrode. The terminals are maintained in spaced relationship and electrically insulated from each other by ceramic spacers 4, 5 and 6. In addition, a pair of heater terminals 7 and 8 project through spacer 6. The terminals and spacers are provided with an hermetic seal along respective mating surfaces, usually by the use of nickel sealing shims (not shown) sandwiched between opposing surfaces, as is well known in the art.

In assembled relationship, the terminals and spacers define a walled electrode cavity, generally shown at 9, which is evacuated. In the tube illustrated the terminals and spacers have annular cross-sections, except for anode 1 and heater terminals 7 and 8 which have circular cross-sections. Cavity 9 is generally cylindrical in form.

The present invention pertains to the cathode assembly which includes cathode terminal 3, annular disk 10 and cathode support sleeve 11. As shown, sleeve 11 is fixed to disk 10 which, in turn, is secured between spacer 5 and cathode terminal 3. By this arrangement of parts, cathode support sleeve 11 is mechanically fixed with reference to spacer 5 and electrically connected to cathode terminal 3 without the metallic material of support sleeve 11 contacting directly the metallic material of terminal 3. Disk 10 is the buffer between sleeve 11 and terminal 3.

Figure 2:
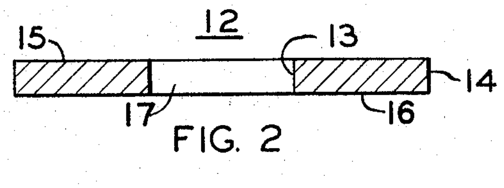
FIGS. 2 through 7 show a cross-section of an annular cathode terminal assembly in the various progressive steps of manufacture in accordance with the preferred embodiment of this invention.

FIGS. 2 through 7 show the evolution of a cathode assembly such as shown in FIG. 1, tracing the various manufacturing steps which are performed. FIG. 2 is a cross-section of an annular cathode terminal, generally shown at 12. Cathode terminal 12 must be constituted of a material which does not evolve gas at temperatures in the order of 1100° C. In addition, the material must be one which can supply a suitable conductive path for providing a lead-out for the cathode, and which may be hermetically sealed to a refractory material such as ceramic. Cathode terminal 12 is preferably constituted at least in part of titanium, if not entirely of this metal, since titanium not only satisfies the aforementioned criteria but also provides a thermal coefficient of expansion compatible with that of ceramic material. Cathode terminal 12 includes inner and outer peripheral surfaces 13 and 14, respectively, and upper and lower planar end surfaces 15 and 16, respectively. Inner peripheral surface 13 defines a walled cavity 17.

Figure 3:
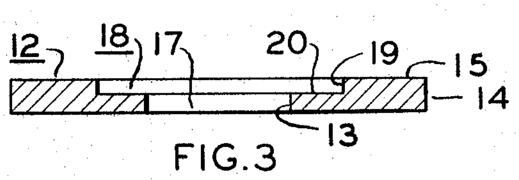

FIG. 3 illustrates cathode terminal 12 after an annular recess 18 has been formed in planar upper end surface 15. As shown, recess 18 opens into cavity 17 and includes an inner peripheral surface 19 and recess lower surface 20.

Figure 4:
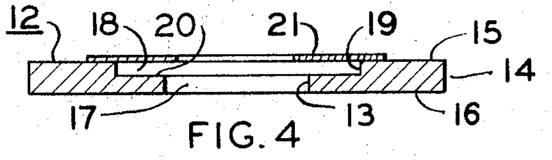

As shown in FIG. 4, an annular sealing shim 21 is disposed coaxially with cathode terminal 12, abutting the upper planar surface 15 thereof and extending inwardly over recess 18. Alignment is achieved, preferably, by using an alignment jig (not shown) and the shim 21 is secured to cathode terminal 12, by spot welding thereto. Shim 21 is constituted at least in part of nickel, and may be constituted entirely of this metal.

Figure 5:
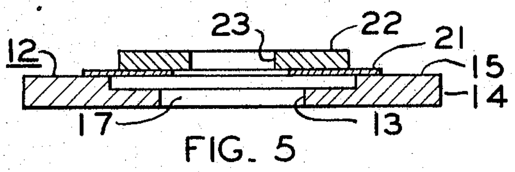

As illustrated in FIG. 5, an annular disk 22, having substantially spaced inner and outer peripheral surfaces, is aligned with cathode terminal 12 and shim 21. Disk 22 abuts a portion of the upper surface of shim 21 and the inner peripheral surface 23 of disk 22 extends inwardly further than inner peripheral surface 13 of cathode terminal 12. The remaining dimensions of disk 22 are substantially equal to corresponding dimensions of annular recess 18 in cathode terminal 12.

Figure 6:
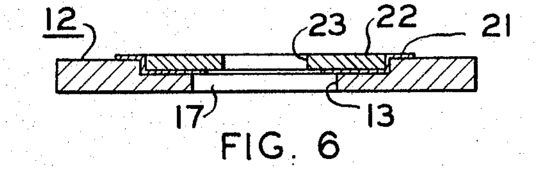

In FIG. 6, annular disk 22 is shown pressed into recess 18, shown in FIG. 4. During this step of the manufacture, shim 21 is deformed to line inner peripheral surface 19 and to line a substantial portion of surface 20 of recess 18. Shim 21 is sandwiched between opposing surfaces of disk 22 and terminal 12. The outer segment of disk 22 substantially fills the recess 18 in terminal 12 and the inner peripheral surface 23 of disk 22 extends into cavity 17. Disk 22 is then temporarily secured in place with a suitable cement.

Figure 7:
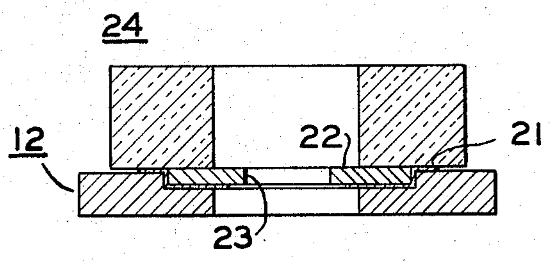

As illustrated in FIG. 7, an annular insulating spacer 24 is disposed coaxially with terminal 12. Spacer 24 is cemented in the position shown relative to terminal 12 to provide a spacer-terminal assembly. The assembly is then compressed in an alignment and sealing jig (not shown) and heated in a vacuum oven to a temperature in the range of 800° C. to 1100° C., whereby the shim and terminal alloy and an hermetic seal is provided between spacer 24 and terminal 12. At the same time, disk 22 is rigidly held in position in recess 18 by the overlapping portion of spacer 24 which bears against disk 22. One annular planar surface of spacer 24 abuts portions of the upper surfaces of disk 22, sealing shim 21 and terminal 12.

Figure 8:
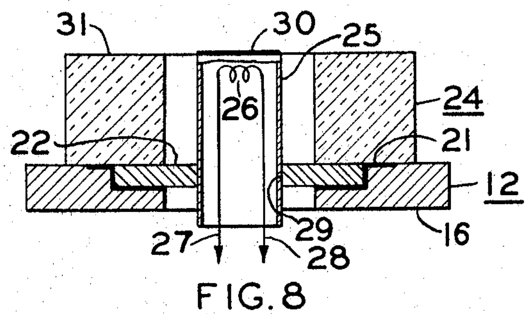
FIG. 8 is a cross-section of the completed cathode assembly and support constructed in accordance with the steps illustrated in FIGS. 1 through 7.

After the cathode terminal and support assembly has been completed, as by the above-mentioned steps, the cathode is ready to be secured to the assembly. As shown in FIG. 8, the cathode includes an active electron-emitting surface in the form of a disk 30 carried by a cathode support sleeve, or cylinder, 25. To obtain the requisite mechanical, electrical and thermal properties, preferably, sleeve 25 is constituted of a nickel-chromium alloy. In order to heat the cathode, a heater 26 is shown adjacent cathode disk 30, and power is supplied to heater 26 through heater leads 27 and 28. The cathode is secured relative to the cathode support assembly by securing cathode sleeve 25 to the inner peripheral surface 23 of disk 22, as by welding along the interface 29 of the sleeve and disk.

Subsequent manufacturing steps include shaving the upper surface of cathode disk 30 so that it is accurately referenced with regard to upper surface 31 of spacer 24, sealing an anode or grid terminal to upper surface 31, and sealing an insulating spacer to under surface 16 of terminal 12. Some of the subsequent steps involve heating the assembly of FIG. 8 to high temperatures to achieve additional sealing.

In accordance with the present invention, the material of disk 22 is constituted of a metallic material which will not alloy with the nickel of the nickel-chromium alloy support sleeve 25 during subsequent heating steps in the manufacture of the ceramic tube or during operation of the tube. Normally it is sufficent to provide a material for disk 22 having an alloying temperature with nickel above 1100° C. For example, disk 22 may be constituted of tantalum or 430 stainless steel. Alloying is thereby prevented at the interface 29 between sleeve 25 and disk 22 and relative movement of these members is prevented. Disk 22 is securely mechanically fixed with reference to spacer 24 and terminal 12. The accurate positioning and alignment of cathode disk 30 with respect to the upper surface 31 of spacer 24 cannot be disturbed. This result is achieved by isolating the metal of terminal 12 from the nickel-chromium alloy of support sleeve 25 by using disk 22 to provide both support and isolation.

Figure 9:
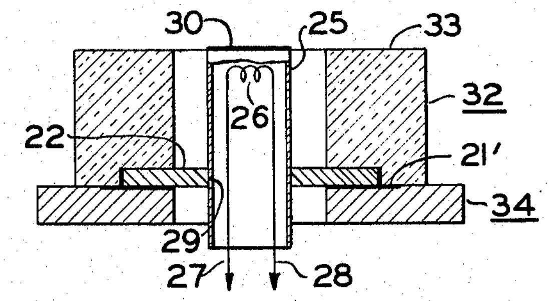
FIG. 9 is a cross-section of an alternative embodiment of this invention.

FIG. 9 illustrates an alternative embodiment of this invention, wherein the annular disk 22 is positioned in a recess opening into the cavity formed in spacer 32, rather than positioned in a recess formed in terminal 12 as in the embodiment of FIG. 8. The upper segment of disk 22 overlaps a portion of the upper surface of cathode terminal 34 and substantially fills the recess in spacer 32. Since the primary dimension to be maintained is the relationship of the surface of cathode disk 30 with reference to the upper surface 33 of spacer 32, the embodiment of FIG. 9 permits the cathode sleeve 25 to be welded to disk 22 along interface 29 prior to the sealing operation. This is accomplished by positioning disk 22 in the recess formed in spacer 32 and temporarily suitably securing the parts by cementing. The relationship between disk 22 and spacer 32 is thereby determined and sleeve 25 may be welded to the inner peripheral surface of disk 22. Thereafter, nickel shim 21' is disposed coaxially with spacer 32. Terminal 34, which is constituted of tantalum, is coaxially aligned and compressed against spacer 32, sandwiching nickel shim 21', in an alignment and sealing jig (not shown). Then the assembly is heated to a temperature in the range of 800° C. to 1100° C. so as to cause alloying between nickel shim 21' and titanium terminal 34, whereby an hermetic seal between the members is formed. As shown, disk 22 provides a support for cathode sleeve 25, while at the same time isolating the nickel-chromium alloy of support sleeve 25 from the titanium of cathode terminal 34, as in the embodiment of FIG. 8.

Figure 10:
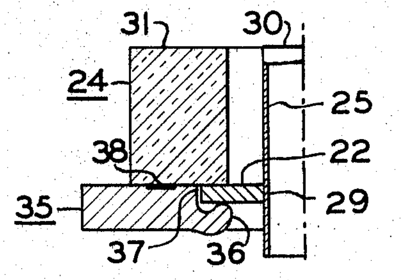
FIG. 10 is a partial cross-section of another alternative embodiment of the invention.

In the alternative embodiment of FIG. 10, disk 22 is shown disposed substantially concentrically inside annular cathode terminal 35. One planar annular end surface of spacer 24 abuts a major part of the upper surface of terminal 35 and a section of the upper surface of disk 22. Terminal 35 includes an annular lip 36 formed on inner peripheral surface 37 and extending under disk 22. Insulating spacer 24 is coaxially aligned with terminal 35 and sealed thereto by nickel shim 38. As shown, the annular lip 36 compresses disk 22 against the lower surface of insulating spacer 24 to clamp securely disk 22 against spacer 24. Cathode support sleeve 25 is then welded to disk 22 along interface 29, and disk 22 performs the supporting and metal isolating functions.

Figure 11:
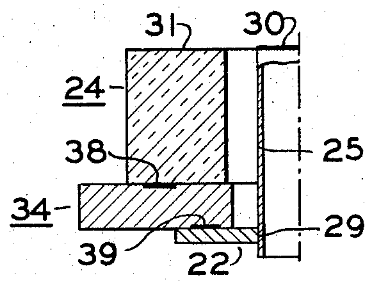
FIG. 11 is a partial cross-section of yet another alternative embodiment of the invention.

In the embodiment of FIG. 11, insulating spacer 24, cathode terminal 34 and disk 22 are coaxially aligned, and sealed in place by nickel shim 38 which is disposed between spacer 24 and terminal 34. Nickel shim 39 is disposed between terminal 34 and disk 22 to secure the disk to the terminal. This embodiment has the advantage of providing a maximum distance between interface 29 and cathode disk 30, thereby providing improved thermal isolation of cathode disk 30 and allowing more efficient heating thereof.

Figure 12:
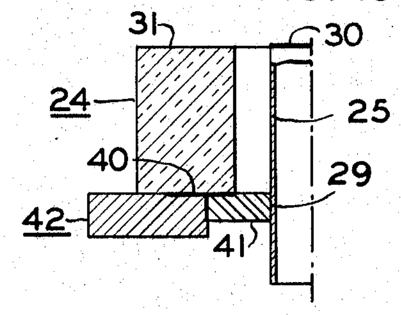
FIG. 12 shows a partial cross-section of still another alternative embodiment of this invention.

In the embodiment of FIG. 12, the outer peripheral surface of disk 41 is adjacent the inner peripheral surface of cathode terminal 42. A single nickel shim 40 is disposed between opposing surfaces of spacer 24, terminal 42 and disk 41. Other than requiring only a single metal shim, this embodiment has the further advantage over that of FIG. 11 of more easily allowing accurate positioning of disk 41 with reference to spacer 24 since the two members abut.

While there has been described in connection with this invention a number of specific examples and constructions whereby a cathode may be mounted within a ceramic tube while yet providing isolation between the metal of a cathode terminal and a cathode support sleeve, it is not intended that the invention be limited to the specific embodiments shown since many modifications and variations of this invention will readily present themselves to one skilled in the art and fall within the true spirit and scope of the invention as defined solely by the following claims.

What is claimed as new and desired to be secured by Letters Patent of the United States is:

1. In an electron discharge device, a plurality of coaxially disposed metallic terminals, including an annular cathode terminal; a plurality of coaxially disposed insulating spacers, said terminals and said spacers defining a walled electrode cavity; a plurality of electrodes, including a cathode carried by a metal support sleeve, positioned in said cavity and electrically connected to corresponding ones of said terminals; an annular metal disk having substantially spaced inner and outer peripheral surfaces the outer peripheral surface of said annular metal disk being adjacent the inner peripheral surface of said cathode terminal; first securing means fixing said disk near its outer peripheral surface to the wall of said cavity in juxtaposition to the inner peripheral surface of said cathode terminal; and, second securing means fixing said metal support sleeve of the cathode to the inner peripheral surface of said disk said first securing means comprising an annular metal sealing shim having at least a portion thereof sandwiched between the adjacent surface of said disk and said cathode terminal.

2. The electron discharge device of claim 1 wherein one of the insulating spacers includes an annular planar surface abutting part of the upper surface of said cathode terminal; an annular recess is formed in the upper surface of said cathode terminal, said recess having an opening into said cavity; the outer segment of said annular metal disk substantially fills said recess; and said metal sealing shim lines said recess and extends between opposing surfaces of said one spacer and said cathode terminal.

3. The electron discharge device of claim 1 wherein one of the insulating spacers includes an annular planar surface abutting the major part of the upper surface of said cathode terminal; an annular recess is formed in said one spacer adjacent the upper surface of said cathode terminal, said recess having an opening into said cavity; the outer segment of said annular metal disk overlaps said cathode terminal and substantially fills said recess; and said metal sealing shim is sandwiched between a portion of said cathode terminal and the surface of said one spacer adjacent said portion.

4. The electron discharge device of claim 1 wherein said cathode terminal and said annular metal disk overlap and said annular metal sealing shim is sandwiched between the adjacent surfaces of said disk and said cathode terminal.

5. In an electron discharge device, a plurality of coaxially disposed metallic terminals, including an annular cathode terminal; a plurality of coaxially disposed insulating spacers, said terminals and said spacers defining a walled electrode cavity; a plurality of electrodes, including a cathode carried by a metal support sleeve; positioned in said cavity and electrically connected to corresponding ones of said terminals; an annular metal disk having substantially spaced inner and outer peripheral surfaces; first securing means fixing said disk near its outer peripheral surface to the wall of said cavity in juxtaposition to the inner peripheral surface of said cathode terminal; and, second securing means fixing said metal support sleeve of the cathode to the inner peripheral surface of such disk, said annular metal disk disposed substantially concentrically inside said cathode terminal; one of said insulating spacers includes an annular planar surface abutting a major part of the upper surface of said cathode terminal and a section of the upper surface of said disk, said cathode terminal being fixed to said annular planar surface; and said first securing means comprises an annular lip formed on the inner peripheral surface of said cathode terminal and extending under said annular metal disk, whereby said disk is clamped against the annular planar surface of said one spacer.

References Cited by the Examiner

UNITED STATES PATENTS

| | | | |
|---|---|---|---|
| 2,918,596 | 12/1959 | Dijksterhuis ------ | 313—250 X |
| 2,923,847 | 2/1960 | Childs et al. --------- | 313—250 |
| 3,023,341 | 2/1962 | Kendall et al. ------- | 313—250 |
| 3,151,264 | 9/1964 | Van Warmerdam -- | 313—348 X |

JOHN W. HUCKERT, *Primary Examiner.*

A. J. JAMES, *Assistant Examiner.*